Apr. 10, 1923.
F. B. VORACEK
AIRPLANE
Filed Oct. 18, 1920
1,451,352
6 sheets-sheet 1
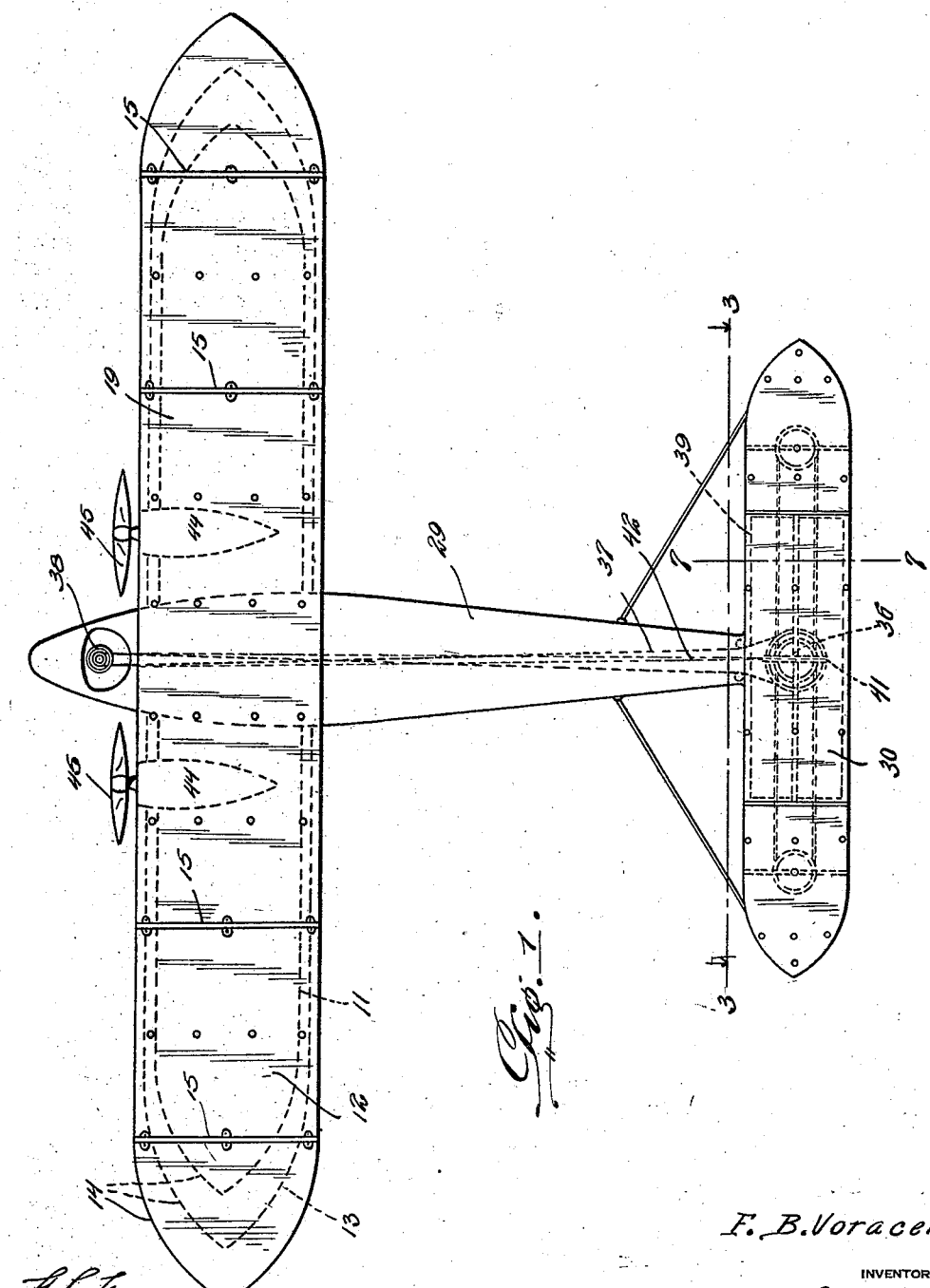

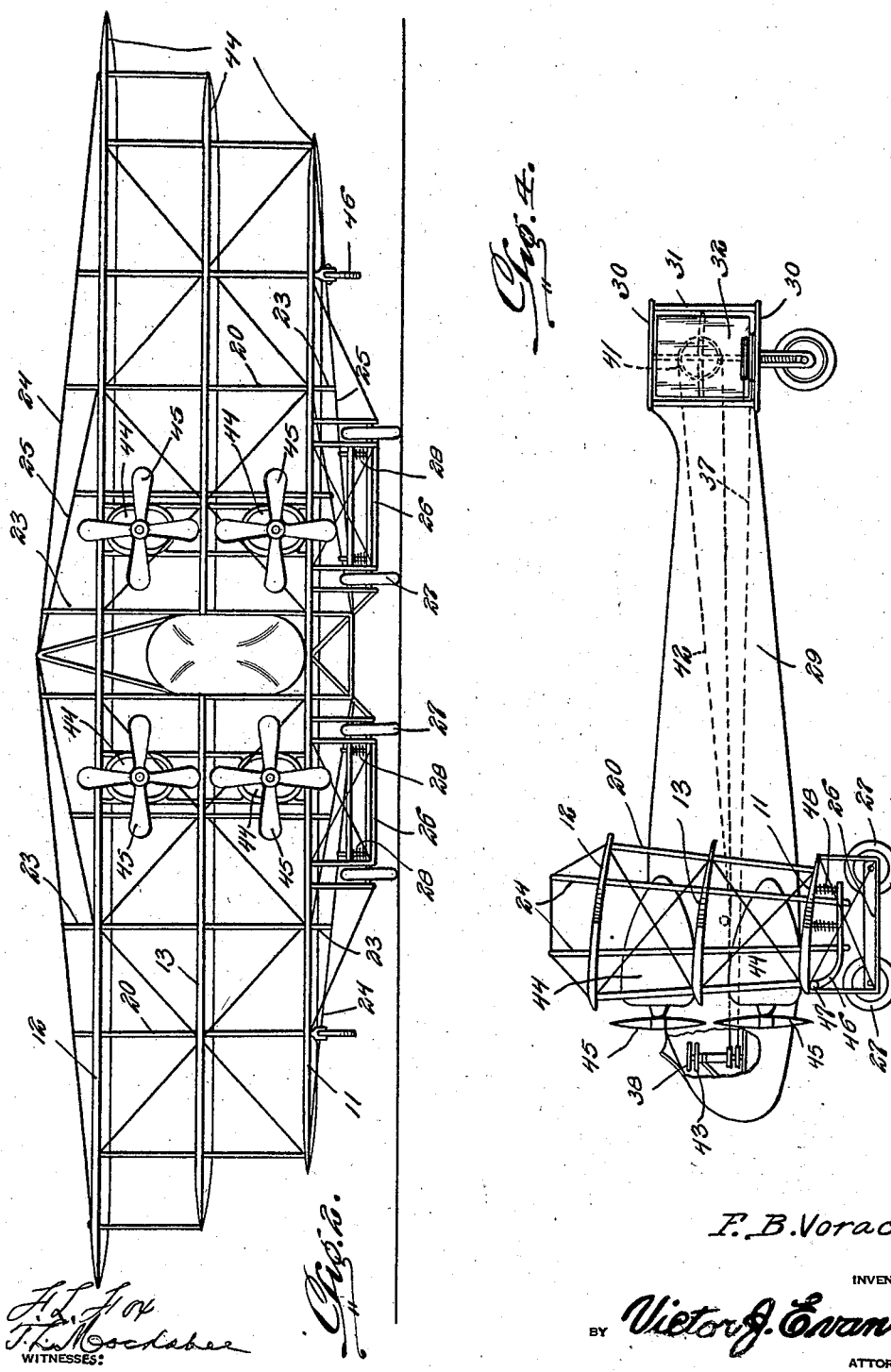

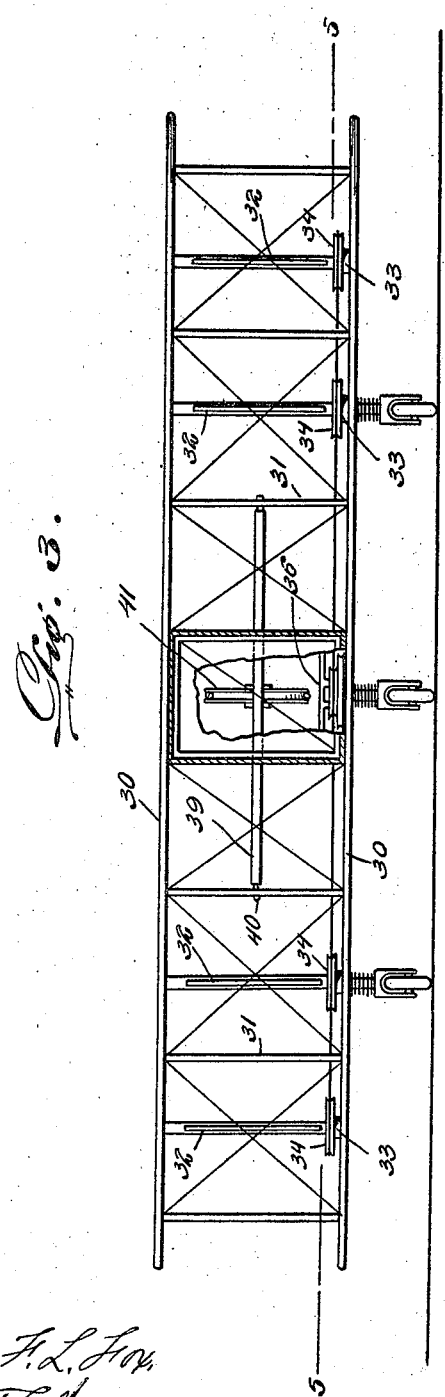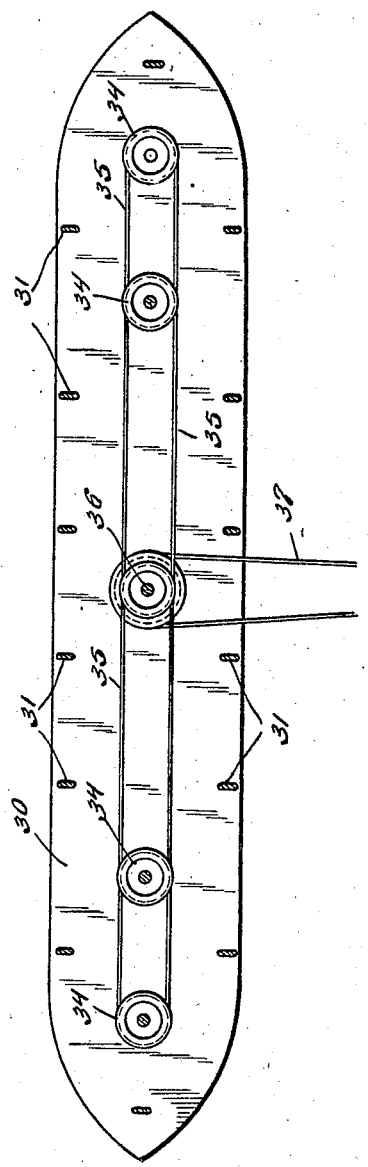

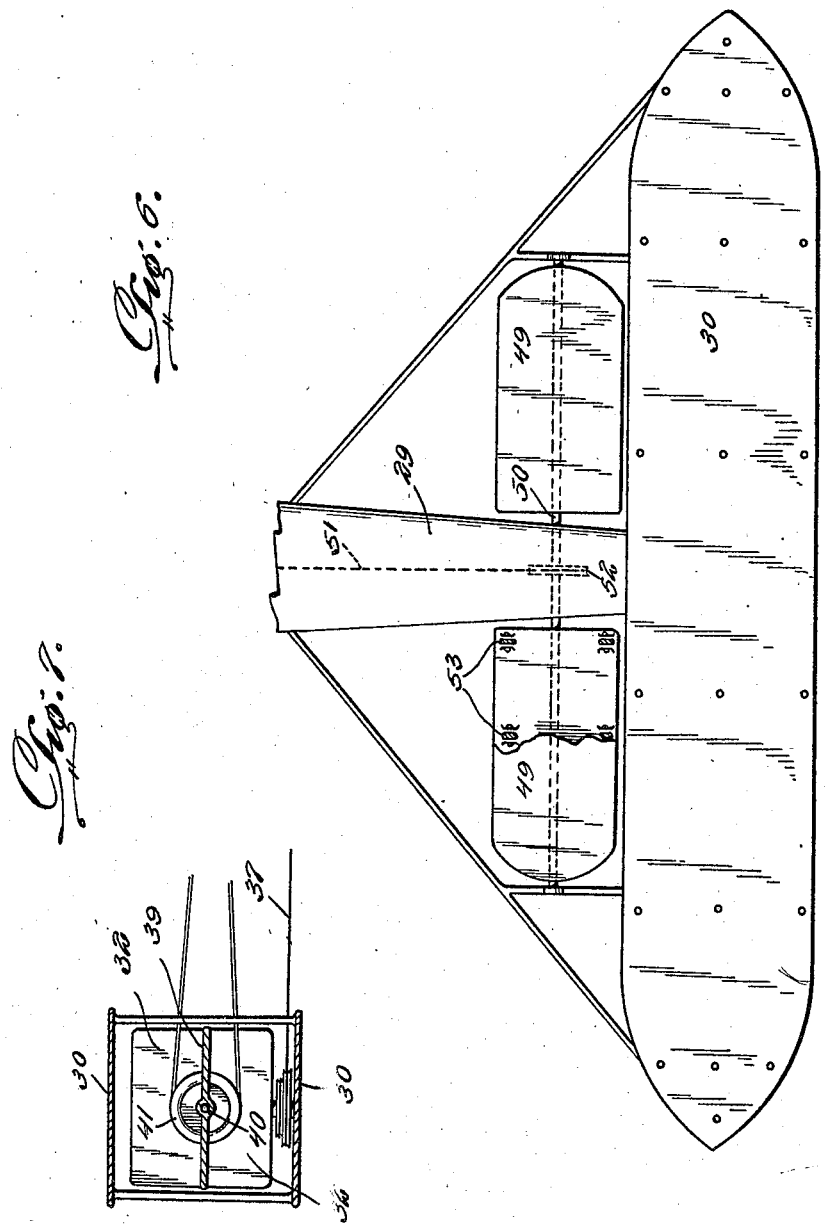

Apr. 10, 1923.

F. B. VORACEK
AIRPLANE
Filed Oct. 18, 1920

F. B. Voracek
INVENTOR

BY Victor J. Evans
ATTORNEY

WITNESSES:

Apr. 10, 1923.

F. B. VORACEK

AIRPLANE

Filed Oct. 18, 1920

Patented Apr. 10, 1923.

1,451,352

UNITED STATES PATENT OFFICE.

FRANK B. VORACEK, OF PORTLAND, OREGON.

AIRPLANE.

Application filed October 18, 1920. Serial No. 417,535.

*To all whom it may concern:*

Be it known that I, FRANK B. VORACEK, a citizen of the United States, residing at Portland, in the county of Multnomah and State of Oregon, have invented new and useful Improvements in Airplanes, of which the following is a specification.

This invention relates to improvements in airplanes and has for an object the provision of a novel form of plane structure which renders the wings strong and durable without materially increasing the weight.

Another object is the provision of an airplane having a multi-plane structure, in which the chord of the top plane exceeds the chord of the lowermost plane and so locates the center of gravity as to increase stability.

Another object is the provision of a novel arrangement of both horizontal and vertical rudder control, together with a novel arrangement of rudders.

Other objects and advantages of the invention will appear as the following description is read in connection with the accompanying drawings.

In the drawings:—

Figure 1 is a plan view of an airplane constructed in accordance with the invention.

Figure 2 is a front view of the same.

Figure 3 is a section on the line 3—3 of Figure 1 looking in the direction of the arrow.

Figure 4 is a side elevation of the machine.

Figure 5 is a section on the line 5—5 of Figure 3.

Figure 6 is a fragmentary plan view illustrating a different arrangement of elevating rudder.

Figure 7 is a section on the line 7—7 of Figure 1.

Figure 8:
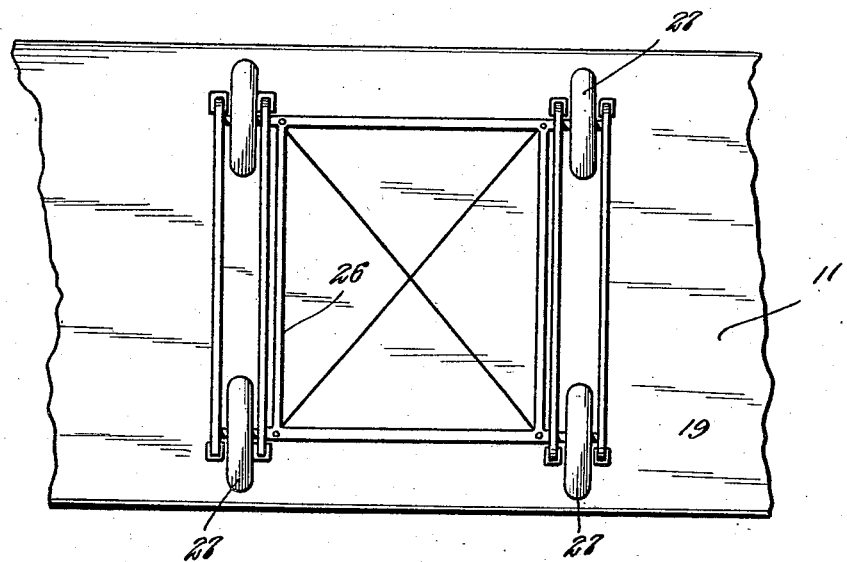
Figure 8 is a fragmentary bottom plan view showing the landing gear.
Figure 11:
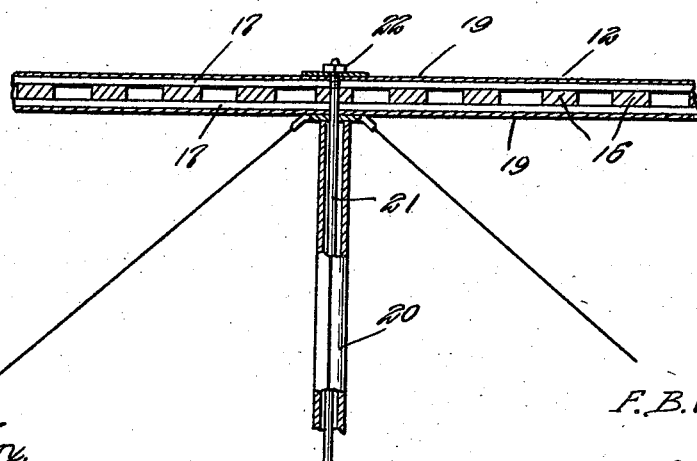
Figure 11 is a fragmentary section on an enlarged scale showing the manner of securing the struts to the planes.

Referring to the drawings in detail, wherein like characters of reference denote corresponding parts, the invention is shown as comprising a machine of the triplane type and includes a lower plane 11 and the upper plane 12 and the intermediate plane 13. These planes are substantially similar in construction, being provided with tapered ends 14 and constructed of separate panels which are joined together as indicated at 15.

The planes or wings 11, 12 and 13 decrease in length from the top to the bottom wing and have chords of different lengths so that the transverse width of the wings also decreases from the top to the bottom of the wing. This places the greatest wing surface at the top of the machine and acts to increase stability by properly positioning the center of gravity.

Figure 9:
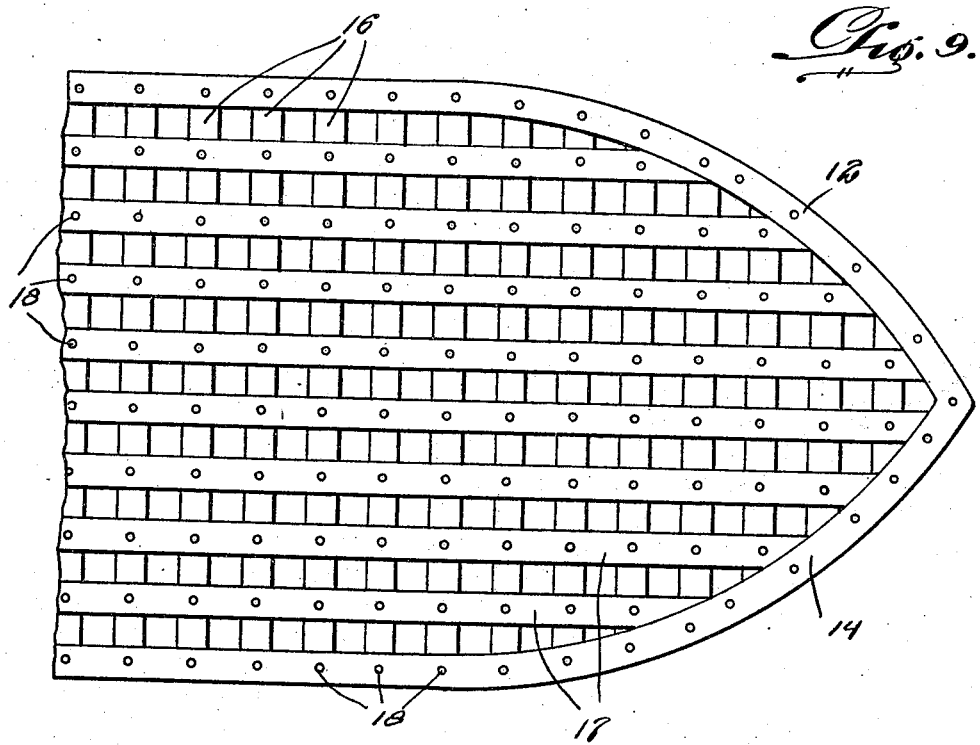
Figure 9 is a fragmentary plan view illustrating the plane structure.
Figure 10:
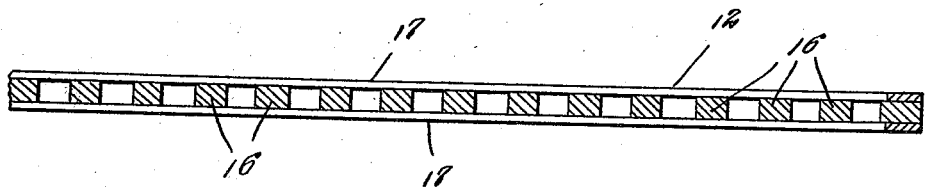
Figure 10 is an enlarged longitudinal sectional view of the same.

The wing structure is illustrated in detail in Figure 9 and 10 and comprises spaced transverse strips 16 and spaced longitudinally disposed strips 17, the latter being spaced above and below the strips 16 and connected thereto by fastening devices 18, the strips being covered with a covering 19 of suitable fabric.

The wings are connected together by struts 20 which are of hollow construction and rods 21 extending through these struts beyond the wings and are provided with nuts 22, the ends of the struts bearing against the wing structure and acting to space the wings apart. Additional struts 23 have their ends extended beyond the wings and are connected by guy wires 24 and 25, so that a truss arrangement is provided.

The lower wing 11 is provided with a landing gear which includes a pair of frames 26 arranged upon opposite sides of the center of the wing and these frames carry wheels 27. The frames are provided with suitable shock absorbing or cushion springs 28.

The fuselage which is indicated at 29 extends transversely through the wings and carries at its rear end spaced rigid stabilizing planes 30, whose structure may be similar to the wings 11, 12 and 13. The planes 30 may be connected by struts 31 which are similar to the struts 20 previously described.

Mounted between the planes 30 are vertical rudders 32, the latter being pivotally supported as indicated at 33 upon shafts. Any number of these rudders 32 may be placed upon opposite sides of the center of the machines. Each of the shafts 33 has secured thereon a grooved pulley 34 and passing around this grooved pulley is a cable 35, which also passes around the centrally arranged shaft 36. The cable is then carried forward as indicated at 37, and is secured to a suitable control mechanism which includes a steering wheel 38. By operating this wheel the rudders 32 may be moved upon their pivots to control the horizontal movement of the machine.

Also pivotally mounted between the planes 30 is a horizontal rudder 39 whose shaft 40 has secured thereon a grooved pulley 41. Passing over this pulley is a cable 42 which leads to a suitable controlling mechanism which includes a steering wheel 43. The wheels 38 and 43 may be arranged one above the other as shown in the drawings, or any other suitable arrangement may be employed.

Any desired number of motors may be employed to furnish power for the operation of the machine, the drawings illustrating four motor housings 44 which are suitably supported between the wings, the motors of which drive propellers 45. Wing runners 46 may be secured at each end of the wings 11, the said runners being shown as having a pivotal connection 47 with the wings, while shock absorbers 48 also connect the runners and wings so as to reduce shock of landing.

In Figure 6 there is illustrated a different arrangement of horizontal rudders. These rudders are positioned at the forward edges of the stabilizing planes 30 and are indicated by the reference numeral 49. They are pivotally mounted as shown at 50 and are controlled by a cable 51 which passes over a grooved pulley 52 and leads to a suitable control. The rudders 49 are arranged one above the other and are connected by links 53, so that a movement of the lower rudder through the operation of the cable 51 will impart a like movement to the upper rudders.

The invention is susceptible of various changes in its form, proportions and minor details of construction and the right is herein reserved to make such changes as properly fall within the scope of the appended claims.

Having described the invention what is claimed is:—

1. In an airplane, the combination of a fuselage tapering toward both ends and terminating in a blunt nose, triple deck wings extending horizontally from the fuselage, double deck tail planes extending horizontally from the fuselage, vertical and horizontal rudders within the tail plane, quadruple motors within the triple deck wings, propellers in front of the triple deck wings, running gears underneath the wings and the planes, and operating means in the nose of the fuselage ahead of the wings and the propellers.

2. In an airplane, the combination of a fuselage tapering toward both ends and terminating in a blunt nose at the front, the rear end terminating in tail planes, triple deck wings extending horizontally from the fuselage, double deck tail planes extending horizontally from the fuselage, vertical and horizontal rudders within the tail planes, quadruple motors in the triple deck wings, propellers in front of the triple deck wings, running gears underneath the wings and the planes and an operating means in the nose of the fuselage ahead of the wings and the propellers.

3. In an airplane, the combination of a fuselage terminating at the front in a blunt nose, triple deck wings extending horizontally from the fuselage, each of said wings tapering at both ends, and the area of the wings decreasing from a maximum for the top wing to a minimum for the bottom wing, double deck tail planes extending horizontally from the fuselage, vertical and horizontal rudders within the tail plane, quadruple motors in the triple deck wings, propellers in front of the triple deck wings, running gears underneath the wings and the planes, and operating means in the nose of the fuselage ahead of the wings and the propellers.

4. In an airplane, the combination of a fuselage tapering toward both ends and terminating in a blunt nose at the front, triple deck wings extending horizontally from the fuselage, double deck tail planes extending horizontally from the fuselage, each of said tail planes tapering individually toward both ends and being of equal area, vertical and horizontal rudders within the tail planes, quadruple motors in the triple deck wings, propellers in front of the triple deck wings, running gears underneath the wings and the planes, and operating means in the nose of the fuselage ahead of the wings and the propellers.

5. In an airplane, the combination of a fuselage tapering toward both ends and terminating in a blunt nose at the front, triple deck wings extending horizontally from the fuselage, double deck tail planes extending horizontally from the fuselage, a plurality of vertical rear rudders pivotally mounted within the tail planes, a horizontal rudder within the tail planes, quadruple motors in the triple deck wings, propellers in front of the triple deck wings, running gears underneath the wings and the planes and operating means in the nose of the fuselage ahead of the wings and the propellers.

6. In an airplane, the combination of a fuselage tapering toward both ends and terminating in a blunt nose at the front, triple deck wings extending horizontally from the fuselage, double deck tail planes, extending horizontally from the fuselage, vertical rear rudders within the tail planes, horizontal rear rudders pivotally mounted at right angles to the fuselage and in front of the tail planes, quadruple motors in the triple deck wings, propellers in front of the triple deck wings, running gears underneath the wings and planes and operating means in the nose of the fuselage ahead of the wings and the propellers.

7. In an airplane, the combination of a fuselage tapering toward both ends and terminating in a blunt nose, triple deck wings extending horizontally from the fuselage, double deck tail planes extending horizontally from the fuselage, vertical and horizontal rear rudders pivotally mounted in the tail planes, quadruple motors in the triple deck wings, said motors being supported by the wing structure and disposed in the corners of an imaginary rectangle in which the nose of the fuselage occupies the center, propellers in front of the triple deck wings, running gears underneath the wings and the planes, and operating means in the nose of the fuselage ahead of the wings and the propellers.

8. In an airplane, the combination of a fuselage tapering toward both ends and terminating in a blunt nose at the front, triple deck wings extending horizontally from the fuselage, double deck tail planes extending horizontally from the fuselage, vertical and horizontal rear rudders within the tail planes, quadruple motors in the triple deck wings, propellers located in front of the triple deck wings, each of said propellers having a quadruple blade, running gears underneath the wings and the planes, and operating means in the nose of the fuselage ahead of the wings and the propellers.

9. In an airplane, the combination of a fuselage tapering toward both ends and terminating in a blunt nose at the front, triple deck wings extending horizontally from the fuselage, double deck tail planes, extending horizontally from the fuselage, vertical and horizontal rear rudders pivotally mounted within the tail planes, quadruple motors in the triple deck wings, propellers in front of the triple deck wings, running gears underneath the triple deck wings, said running gears comprising a frame with four wheels on each side of the fuselage, and sled runners at both ends of the wings, a running gear underneath the tail planes, and operating means in the nose of the fuselage ahead of the wings and the propellers.

10. In an airplane, the combination of a fuselage tapering toward both ends and terminating in a blunt nose, triple deck wings extending horizontally from the fuselage, double deck tail planes extending horizontally from the fuselage, vertical and horizontal rear rudders within the tail planes, quadruple motors in the triple deck wings, propellers in front of the triple deck wings, running gears underneath the wings, running gears underneath the rear planes, said last named running gears comprising a single wheel at the center and a single wheel half way between the center and the end, and operating means in the nose of the fuselage ahead of the wings and the propellers.

In testimony whereof I affix my signature.

FRANK B. VORACEK.